United States Patent [19]
Lasky et al.

[11] Patent Number: 6,121,039
[45] Date of Patent: *Sep. 19, 2000

[54] COMPOSITION, METHOD AND APPARATUS FOR SAFE DISPOSAL OF OIL CONTAMINATED FILTER MEDIA

[76] Inventors: William M. Lasky, 4414 Playfair La., Charlotte, N.C. 28277; James H. Cornwell, 1953 Piestwick La., Wilmington, N.C. 28405

[*] Notice: This patent is subject to a terminal disclaimer.

[21] Appl. No.: 08/992,693

[22] Filed: Dec. 17, 1997

Related U.S. Application Data

[63] Continuation-in-part of application No. 08/742,849, Nov. 1, 1996, Pat. No. 5,817,504.

[51] Int. Cl.⁷ .................................................... C12S 13/00
[52] U.S. Cl. ...................... 435/262.5; 435/264; 435/810; 588/255
[58] Field of Search ................................ 435/262, 262.5, 435/264, 281, 176, 179, 810; 210/611; 588/249, 252, 253, 255, 900, 901

[56] References Cited

U.S. PATENT DOCUMENTS

| | | |
|---|---|---|
| 2,396,900 | 3/1946 | Taggart, Jr. . |
| 2,769,750 | 11/1956 | Harris . |
| 3,220,928 | 11/1965 | Brenner ................................... 435/264 |
| 3,347,297 | 10/1967 | Garland . |
| 3,532,599 | 10/1970 | Cooperman . |
| 3,769,164 | 10/1973 | Azarowicz ............................... 435/281 |
| 3,843,517 | 10/1974 | McKinney et al. ...................... 435/281 |
| 4,111,813 | 9/1978 | Preus . |
| 4,446,236 | 5/1984 | Clyde . |
| 4,530,763 | 7/1985 | Clyde et al. . |
| 4,689,301 | 8/1987 | Adet et al. . |
| 4,988,443 | 1/1991 | Michaels et al. . |
| 5,039,414 | 8/1991 | Mueller et al. . |
| 5,211,961 | 5/1993 | Adkinson ................................. 424/616 |
| 5,344,557 | 9/1994 | Scanzillo . |
| 5,376,183 | 12/1994 | Gatt et al. . |
| 5,395,535 | 3/1995 | Pinckard . |
| 5,458,773 | 10/1995 | Holland . |
| 5,541,096 | 7/1996 | Nomura et al. . |
| 5,554,575 | 9/1996 | Cutler et al. ............................. 502/404 |
| 5,589,004 | 12/1996 | Lashmett et al. ....................... 435/264 |
| 5,716,840 | 2/1998 | Kahler et al. . |
| 5,817,504 | 10/1998 | Lasky et al. .......................... 435/262.5 |
| 5,821,113 | 10/1998 | Haslimann .............................. 435/264 |
| 5,854,012 | 12/1998 | Lasky et al. ............................. 435/29 |

FOREIGN PATENT DOCUMENTS

| | | |
|---|---|---|
| 0 255 354 | 2/1988 | European Pat. Off. . |
| 7-116514 | 5/1995 | Japan . |
| 2 159 834 | 12/1985 | United Kingdom . |
| WO 93/25480 | 12/1993 | WIPO . |
| 94/23802 | 10/1994 | WIPO . |

*Primary Examiner*—William H. Beisner
*Attorney, Agent, or Firm*—Millen, White, Zelano & Branigan, P.C.

[57] ABSTRACT

There is provided compositions, methods and apparatus (kits) for treating petroleum and petro-chemical based contaminants within expended filtration components, wherein the filtration components are exposed to a coagulant which forms a solid or gel with the petroleum or petro-chemical based compound when exposed to water to prevent leeching and/or they are exposed to an enzymatic oxidizing medium, such as petroleum digesting bacteria, to decompose the petroleum and petro-chemical based compounds.

37 Claims, 3 Drawing Sheets ized oxidizing medium capable of enzymatically oxidizing petro-
COMPOSITION, METHOD AND APPARATUS FOR SAFE DISPOSAL OF OIL CONTAMINATED FILTER MEDIA This is a continuation-in-part of application Ser. No. 08/742,849 filed Nov. 1, 1996, which issued as U.S. Pat. No. 5,817,504.

BACKGROUND OF THE INVENTION

Increased Federal, State and Local environmental regulations have produced an increased focus of environmental consciousness on a global level. The Environmental Protection Agency (EPA) along with the Occupational Safety and Health Administration (OSHA) have instituted increased and stringent regulations for the processing, manufacturing, utilization, and disposal of chemical compounds. For the purpose of this invention, the regulations of particular interest are those in the field of petroleum products, particularly those consisting of petroleum and petro-chemical based compounds (lubricating oils).

There are existing today numerous technologies for the reclamation and reprocessing of petroleum and petro-chemical compounds including the recovery of oil to be used in power stations and factories as an alternative source of fuel. When dealing with large volumes of these waste streams, there is a certain degree of technological and economic feasibility. One particular segment of this disposal market deals specifically with a variety of filtration components such as engine oil filter media and other filtration media utilized in automotive truck, marine and aircraft applications. These filtration media, when removed from the engine application, do represent petroleum and petro-chemical contaminated materials. These filtration media typically do not provide enough oil on a per unit basis to warrant a recycling activity and so pose a significant disposal problem. This problem is of particular importance in the face of increased environmental regulations which are imposed on large corporations.

SUMMARY OF THE INVENTION

One objective of the present invention is to provide compositions and methods which will facilitate safe disposal of oil contaminated filter media and preferably an accelerated decomposition of the petroleum products within the filter media, most preferably by natural biological decomposition.

Another objective of the present invention is to provide a method for the safe disposal of oil contaminated filter media which meets or exceeds current environmental regulations for disposal of such contaminated materials and which also provides a positive environmental impact.

An additional objective of the present invention is to provide a simple apparatus (kits) for treating contaminated filter media and filter housings to prevent the escape of petroleum and petro-chemical based contaminants therefrom for safe disposal.

Upon further study of the specification and appended claims, further objects and advantages of this invention will become apparent to those skilled in the art.

The present invention provides compositions, methods and apparatus for treating filtration components with petroleum or petro-chemical based compounds entrained therein to prevent leakage of these petroleum and petro-chemical based compounds into the environment. Preferred embodiments incorporate an enzymatic oxidizing medium which accelerates decomposition of these petroleum products.

In one aspect of the present invention, there is provided a composition capable of decomposing petroleum and petro-chemical based compounds which comprises an enzymatic oxidizing medium capable of enzymatically oxidizing petroleum and petro-chemical based compounds, preferably to $CO_2$ and water, and a coagulant which forms a solid or gel with petroleum and petro-chemical based compounds in the presence of water at ambient temperature or a thickener which absorbs petroleum and petro-chemical based compounds or both a coagulant and thickener. Preferably, the coagulant will form a solid or gel with petroleum and petro-chemical based compounds within filtration components to prevent their escape from the filtration components.

In another aspect of this invention, there are provided methods for treating filtration components to prevent the escape of the petroleum and petro-chemical based contaminants entrained therein which comprise exposing the entrained petroleum and petro-chemical based compounds to a coagulant and water to form a solid or gel. In a preferred embodiment, the entrained petroleum and petro-chemical based compound are also exposed to an enzymatic oxidizing medium and maintained under conditions wherein the petroleum and petro-chemical based compounds are decomposed. The entrained petroleum and petro-chemical based compounds are preferably neutralized by means of biochemical and biocatalytic digestion.

In another embodiment of the methods of this invention, a thickener which absorbs the petroleum and petro-chemical based compounds, instead of a coagulant, is used with an enzymatic oxidizing medium.

In a further aspect of this invention, there are provided kits with which petroleum and petro-chemical based compounds entrained within filtration components, i.e., expended filter media and filter housings can be treated. These kits comprise a written protocol identifing the filtration components which can be treated. These kits also include a composition which comprises either a coagulant as described above, an enzymatic oxidizing medium as described above, both a coagulant and enzymatic oxidizing medium or both a thickener and enzymatic oxidizing medium. The written protocol may provide additional instructions for use.

The composition of this invention finds wide use in decomposing petroleum and petro-chemical based compounds, while the methods and apparatus (kits) of this invention are well suited for treating filtration components having petroleum and petro-chemical based compounds entrained therein.

The "petro-chemical based compounds" referred to herein include aromatic hydrocarbons such as toluene and xylene, cresol, nitroaromatics, polychlorinated biphenol, greases, chlorinated aliphatics and aromatics and lipids.

The "filtration components" referred to herein include filter media, filter elements, filter housings and related components. Suitable filter media include those prepared from conventional materials using a conventional configuration such as a corrugated absorbent paper. The filtration components are treated to prevent the escape of petroleum and petro-chemical based compounds entrained therein from escaping into the environment. This is accomplished by solidifying and/or decomposing the petroleum and petro-chemical based compounds.

The compositions, methods and apparatus (kits) of this invention can use a variety of active ingredients for the enzymatic oxidizing medium which decompose petroleum and petro-chemical based compounds. For example, bacteria conventionally known to digest petroleum compounds can be used as an active ingredient of the enzymatic oxidizing medium. There are several forms of *bacillus* which can be successfully colonized upon filter media with petroleum contaminants.

Catalytic enzymes which dehydrogenate petroleum and petro-chemical based compounds can also be used. Examples of the suitable catalytic enzymes may be obtained from extractions of petroleum digesting bacteria listed above. Bacteria which digest petroleum provide advantage in some instances in that colonization serves to increase the activity of the enzymatic oxidizing medium allowing adjustment to the level of contaminants within the filter media. The petroleum and petro-chemical based compounds within contaminated oil filters are sometimes complex and, as such, combinations of bacteria with or without enzymes can be effective in providing full degradation of the compounds to $CO_2$ and water. An example is the combination of *bacillus, licehniformis* (BAS50) and *pseudomonas denitrificans* used together with a dehydrogenase enzyme that serves as a catalyst for the removal of hydrogen atoms to assist in the decomposition and digestion of the petroleum compounds by the bacterium. The amount of active ingredient used within the enzymatic oxidizing medium is dependent on the type deployed and the level of contamination in the filtration components (filter media and/or filter housing).

The active ingredient is used with a carrier such as a solid substrate or liquid to complete the enzymatic oxidizing media. For example, where petroleum digesting bacteria are used as an active ingredient, they can be maintained in a liquid nutrient medium. Alternatively, a protein food source and a specific oil digesting bacteria can both be deposited on a solid substrate, enabling colonization upon the boundary of the substrate layers.

Where the active ingredient within the enzymatic oxidizing medium includes a microorganism, the rate and extent of decomposition by the type of microorganisms that is deployed for digestion of the petroleum compounds are, of course, important selection criteria; however, it is also desirable that the microorganism used can lie in a dormant or semi-starved state until exposed to petroleum material. This is required for complete digestion of the petroleum material to take place. The enzymatic oxidizing medium may contain a sufficient nutrient source to sustain life of the microorganism for at least 30 days but must also cause them to remain at a repressed level of activity; thus, it is concluded that there will be a limited shelf life for some embodiments of this invention. Where the organisms are freeze dried, they are sufficiently dormant such that a nutrient medium need not be packaged with the microorganism in the enzymatic oxidizing medium, but such a configuration is often preferred.

Also of particular importance is the reactivation or resuscitation of the dormant bacteria. In certain embodiments where a coagulant is present, this is accomplished by activating the coagulant with the addition of water. This will provide the oxygen and support for the microorganism to grow. Providing a layer of titanium dioxide initiator will also reactivate the microorganisms. The titanium dioxide is extremely photosensitive and, therefore, readily reacts in the presence of sunlight. Photon energy adsorbed onto the titanium dioxide layer induces oxygen to attach to the oil or petroleum based materials which facilitates and accelerates the oxidation of the oil compounds.

Dormant enzymatic oxidizing media typically must be housed inside of a sealed container such as a polyurethane or other polymer bag that is sufficiently sealed to prevent the introduction of moisture or oxygen present in ambient air so as to remain dormant. Additionally, where a photoinitiator is present, the polyurethane liner must be constructed of an opaque material to prevent premature photoactivation and, as in the case of $TiO_2$ initiators, subsequent oxygenation of the substrate. Without this opaque shielding, premature photoactivation would result in untimely resuscitation of dormant bacterium upon the boundaries of the substrate. Without petroleum compounds available, sustainable life of the bacterium and subsequent digestion and biomass generation of the bacterium on the expended filter media cannot occur.

In embodiments which employ bacterium on a substrate layer as the enzymatic oxidizing medium, it is preferable to treat the substrate with the following components: a biosurfactant, glucose, a $NaNO_3$ solution and a NaCl solution. Such biofilms can actively function and be sustained in environments where the pH is between 4.6 to 9.0. In preferred embodiments, the substrate is treated with sufficient amounts of active ingredients to form a biosphere environment capable of sustaining the bacteria in a repressive state which can be resuscitated by photocatalytic means or by the addition of water.

Dormant bacteria are preferably cultured onto the substrate at a rate of between 1,500–2,100 colony count per $cm^2$ and above. A CFU of above $10^7$ can be achieved with freeze-dried colonies. It should be noted that this is the initial bacterium implant count not the colony count of the bacterium after exposure to the expended filter medium. The growth count is dependent on the amount of the petroleum and petro-chemical based contaminants within the filter media as well as the pH of the petroleum and petro-chemical based contaminants at the time of introduction. In the case of activation by photoinitiation, the magnitude and the duration of the photon energy applied to the photoinitiator will also affect the growth rate.

The coagulants used in the compositions, methods and apparatus (kits) of this invention are those which form a solid or gel with petroleum or petro-chemical based compounds in the presence of water. This coagulant must have covalently bonded hydrogen atoms so that hydrogen bonding can occur with the hydrocarbons found within the petroleum and petro-chemical based compounds. These coagulants are preferably carbon-based compounds having at least two covalently bonded hydrogen atoms to carbon, preferably a methyl group. Suitable compounds fall within the group of polysaccharides, particularly celluloses or derivatives thereof derived from plant fibers. The preferred coagulants comprise methylcelluloses, most preferably natural methyl cellulose and derivatives thereof. Such compounds have been found to provide sufficient hydrogen bonding so as to be activated at ambient temperature upon the addition of water, allowing solubilization and formation of hydrogen bonds with the hydrocarbons present within the petroleum and petro-chemical based compounds. Common derivatives of methylcellulose include carboxymethylcellulose, hydroxypropylmethylcellulose, hydroxyethylmethylcellulose and methylcellulose ethers.

The coagulants such as the methylcellulose or derivatives thereof are preferably used in amounts of from about 15 wt. % to 30 wt. % of the contemplated, entrained petroleum and petro-chemical based compounds. Water is typically used in an amount that forms a ratio of water to coagulant in the range of 0.5:1 to 2:1. The coagulants are typically used in an amount of about 1 fluid ounce with oil filters for conventional automobile engines. Water is typically added at volume of about 2 fluid ounces to generate a hydrocatalytic reaction which causes the oil to congeal into a solid mass.

In certain embodiments, it may be desirable to dope the treated filter medium with thickener agents such as magnesia and kaolinite. Employing up to 3 wt. % $MgCa(CO_3)$ based on the weight of the entrained petro-chemical compounds is recommended but larger amounts can be used. Kaolinite $(Al_2Si_2O_5(OH_4)_2)$ should be added in an amount up to 10% by weight of the entrained petro-chemical compounds but larger amounts can be used.

The thickeners are selected from a wide variety of compounds capable of absorbing petroleum and petro-chemical based compounds. The thickeners encompass both natural and synthetic compounds and in addition to kaolinite and magnesia include the families of the pillared clays, Fuller's earth, aluminas, starches, cellulose and granulated paper products such as paper pulp extracts and all forms of starches, haloysite, illite, monitmorillonite. These thickeners are essentially carbonaceous compounds and can be used in amounts within a wide range since excess amounts are not significantly deleterious. Amounts of about 1–100 wt. % thickener based on the entrained petroleum and petro-chemical based compounds are effective.

The compositions of the present invention comprise an enzymatic oxidizing medium and also either a coagulant, thickener or both. The thickener and/or coagulant provide a stable substrate for the enzymatic oxidizing medium, preferably a petroleum digesting bacterium, as discussed above, to decompose petroleum and petro-chemical based compounds. Where the enzymatic oxidizing medium within the composition of the present invention comprises petroleum digesting bacteria, it also includes growth media. Where the growth medium is liquid, the coagulant and/or thickener may be dissolved therein. Where the growth medium is solid, the coagulant and/or thickener can be mixed therewith or deposited thereon. When treating filter media, a liquid growth medium is desired to aid distribution of the bacterium to the petroleum and petro-chemical based compounds. While compositions of the present invention are well suited for treatment of petroleum and petro-chemical based compounds within filtration components; they are not limited to such end uses.

The kits of the present invention include a written protocol which identifies at least one filtration component which the kit can treat. The written protocol can vary widely in content from specifically identifing a model number or a product name, to a generic description of a "used filter", with the specific filters being identified by a picture, a code or other written indicia, a replacement filter for the filter to be treated or other physical identifier.

In preferred embodiments, the written protocol will include other instructions with respect to use of the individual components. For example, in certain embodiments, the written protocol will indicate that the composition supplied with the kit be added to the filtration components with water.

In addition to the written protocol, the kits of this invention include a composition for treating the petroleum or petro-chemical based compound within the filtration component. This composition can be a solid or liquid. The composition is typically enclosed within a container to prevent premature activation. Where the composition is a solid, such a container is optional.

The composition within the kits of the present invention can comprise simply a coagulant or a petroleum digesting bacteria as defined above. These bacterium are selected to provide activity within the environment of filtration components such as filter media within a filter housing which is not exposed to light. Kits with petroleum digesting bacteria also comprise a growth medium which stabilizes and preserves the microorganism before use.

The composition employed within the kits of the present invention can also include a combination of an enzymatic oxidizing medium and a coagulant or enzymatic oxidizing medium and a thickener. Preferably, a thickener, coagulant and enzymatic oxidizing medium are employed as the composition for the kit. The combination provides the added advantage over the use of either coagulant or enzymatic oxidizing medium alone in accelerating the decomposition of the petroleum and petro-chemical based compounds within the filtration components. The composition may contain other components such as the elastomeric polymer absorbents available under the trademarks Waste-Set 3400, Nochar A610, Nochar A650, Enviro-Bond 403 or an equivalent.

The kits provided by the present invention can contain additional components such as a transparent sealable bag for the purpose of retaining the treated filtration components. This bag provides an added level of security against leakage of petroleum and petro-chemical based products into the environment. The bag can vary significantly in size, dimensions and composition, as long as it allows for an expended filter medium to be placed inside which has been treated with a composition, method or kit of this invention. The material which forms the bag is preferably comprised of polyurethane or similar transparent synthetic. The bag preferably can be recycled or is biodegradable. When the kit includes such a bag, it preferable that it also include a written protocol to indicate that the filtration components are to be inserted in the bag and sealed following treatment with the composition.

Another optional element of the kits provided by the present invention is a replacement filtration component for the filter component treated. Such a replacement filter can serve as a means for identifying the filter to be treated.

FIG. 1 illustrates a kit 50 of the present invention. Kit 50 comprises a written protocol 51 which identifies at least one filtration component for which the kit is suitable. Written protocol 51 is shown as a separate component but may be integrated into other components of the kit such as container 77. Composition 75 is shown within container 77 which is preferred but not required where composition 75 is a solid. Composition 75 is at least either:

1) a petroleum digesting bacteria within a nutrient medium,
2) a coagulant,
3) a combination of an enzymatic oxidizing medium and coagulant,
4) a combination of an enzymatic oxidizing medium and a thickener or
5) a combination of enzymatic oxidizing medium, coagulant and thickener. Composition 75 can either be solid or liquid.

In preferred kits, written protocol 51 also indicates that water is to be placed within a filtration component with composition 75. Written protocol 51 can have other indications, depending on the contents of composition 75. The written protocol can comprise more than one writing and the components of composition 75 can be placed in more than one container. Kit 50 may also include other components such as a transparent bag 135 which is sealable by seal 20 as shown in FIG. 5 and may also include a replacement filtration component for the components treated, which is not shown in FIG. 1.

FIG. 2a illustrates a kit 10 which is another embodiment of the present invention. Kit 10 comprises a replacement filter component 15 with filter media 30 and filter housing 31. Also included in kit 10 is composition 75, as defined above, shown in container 76, which is not required where composition 75 is a solid. Kit 10 further includes written protocol 100 which, at a minimum, identifies the filtration components for which the kit is suitable. Written protocol 100 appears on container 76 but may be separated therefrom. The components of these kits may be separately packaged, transported and/or stored.

FIG. 2b illustrates an alternative configuration for kit 10, wherein written protocol 100 appears on a package 101 for the replacement filter is and container 76.

The enzymatic oxidizing medium useful as composition 75 can be prepared by treatment of a cellulose substrate 150 as shown in FIG. 3 with an aqueous glucose solution (5%). This solution is mechanically applied (spraying, dipping) and is allowed to dry typically at 50° C. for a period of between ten to twelve minutes after which substrate 150 is typically further coated with a second layer of a solution containing 0.2% $NaNO_3$ by the method and means previously mentioned for the glucose coating.

After the second coating, substrate 150 is typically dried under the conditions previously mentioned for the glucose coating. Typically, a third coating is also applied from an aqueous solution containing 5% NaCl in the same manner as the glucose and $NaNO_3$ coatings. It is desirable to obtain a pH factor on such a substrate of between 4.8 and 5.2. Bacteria colonies typically can now be applied to the surface of substrate 150, preferably in an amount sufficient to obtain a colony count of between 1,500 and 2,100 colonies per $cm^2$. The substrate 150 with bacteria colonies is shown in FIG. 4 as enzymatic oxidizing medium 75. An optional preparatory step for the solid enzymatic oxidizing medium 75 is to apply an aqueous slurry comprised of 5–8% of titanium dioxide ($TiO_2$) to substrate 150 which serves as a photoreactant to impart oxygen to the petroleum compound once it is introduced into the containment device. To maintain a photo initiated enzymatic oxidizing medium dormant for extended periods, it is preferably stored in a sealed opaque photoresistant container under environmental conditions consisting of 21–25° C. in temperature and preferably in a low light area until use. Enzymatic oxidizing media which are not photoinitiated or need not be maintained dormant, do not require this container.

While enzymatic oxidizing media in the form of solid substrates can be used, the composition, apparatus (kit) and method of this invention are preferably used with enzymatic oxidizing media in liquid form such as bacteria within a liquid nutrient medium.

The method of this invention for decomposing petroleum and petro-chemical based compounds within filtration components comprises exposing filter media having petroleum and petro-chemical based compounds to an enzymatic oxidizing medium with an active ingredient selected from petroleum digesting bacteria, catalytic enzymes for dehydrogenating hydrocarbons and combinations thereof, which oxidizes the petroleum and petro-chemical based compounds within said filtration components, preferably to $CO_2$ and water. The filtration component is also exposed to a coagulant as defined above or a thickener, also as defined above. The filtration component is further exposed to an amount of water sufficient to activate the enzymatic oxidizing medium to initiate decomposition and where present, the coagulant to form a solid or gel with petroleum and/or petro-chemical based contaminants within the filtration component. The filtration component is then preferably maintained under conditions wherein the enzymatic oxidizing medium oxidizes the petroleum and petrochemical based compounds, preferably to $CO_2$ and water. It may be necessary to disperse the enzymatic oxidizing medium, coagulant, water and residual oil by agitation.

With microorganisms, petroleum digestion commences upon contact or exposure of the contaminants to the organism and water. Where the enzymatic oxidizing medium is dormant prior to exposure to the filter media, the added water activates the enzymatic oxidizing medium. Where the enzymatic oxidizing medium contains a photoinitiator, dormant bacteria can be activated by exposure to sunlight. Indoor lighting provides sufficient photon energy to activate the enzymatic oxidizing medium where the photo reactive compound is titanium oxide. Preferably, the environment within the sealed container will sustain the petroleum digesting bacteria.

The byproducts of preferred treatment methods produce carbon dioxide ($CO_2$) and water vapor ($H_2O$). The presence of water and the production of $Q_2$ from coagulation provide a highly productive environment in which bacteria can actively multiply. These biochemical reactions and reproduction cycles preferably continue until the filter medium approaches an equilibrium meaning that all of the petroleum products and nutrients have been digested and decomposed by the bacteria and there is no longer a sufficient food source to sustain life of the petroleum digesting bacteria.

This process can decompose petroleum without any hazardous byproducts. When the enzymatic oxidizing medium used is a solid, the supporting material of the enzymatic oxidizing medium is preferably comprised of a biodegradable material such as cellulose. In preferred embodiments, the filter media is digested as well with the only material remaining being the filter housing and seals of the original filtration components and any photo-oxygenation media ($TiO_2$).

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

Figure 1:
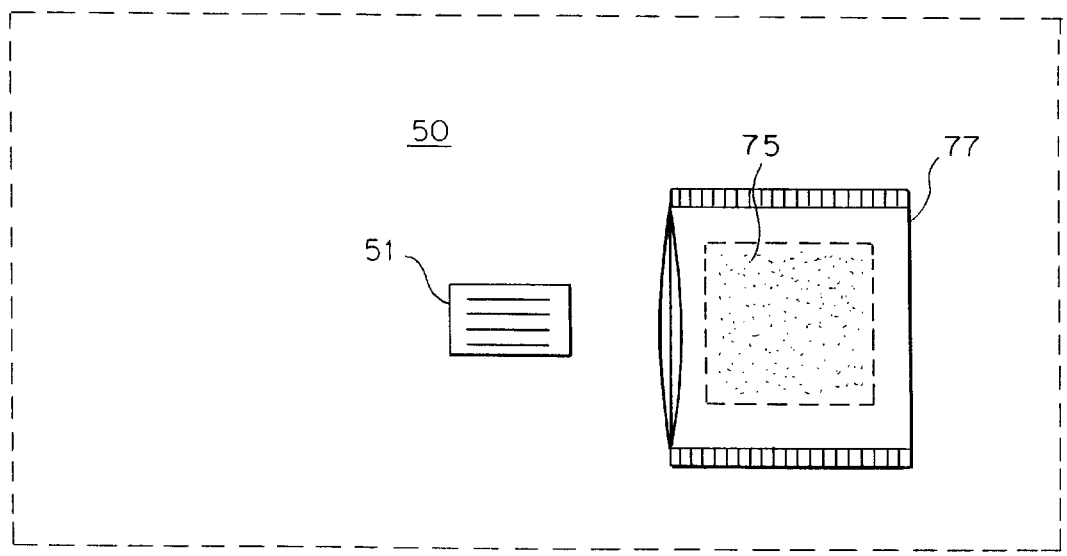
FIG. 1 illustrates a kit of the present invention for treating petroleum and petro-chemical based compounds within filtration components.
Figure 2A:
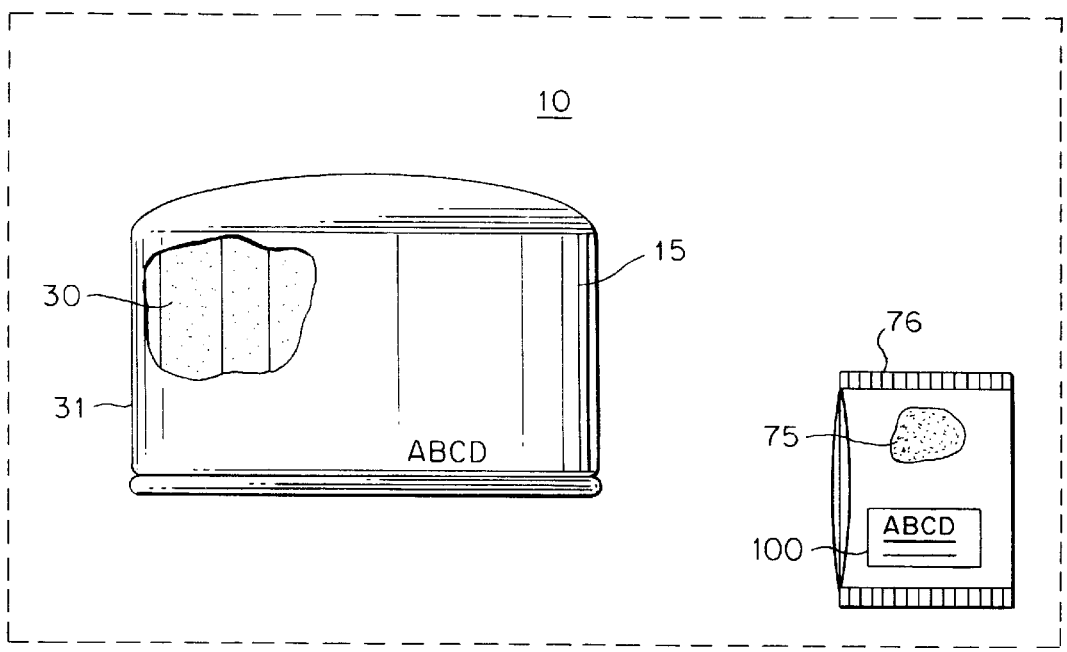
FIGS. 2a and 2b illustrate another kit of the present invention for treating petroleum and petro-chemical based compounds within the filtration components.
Figure 2B:
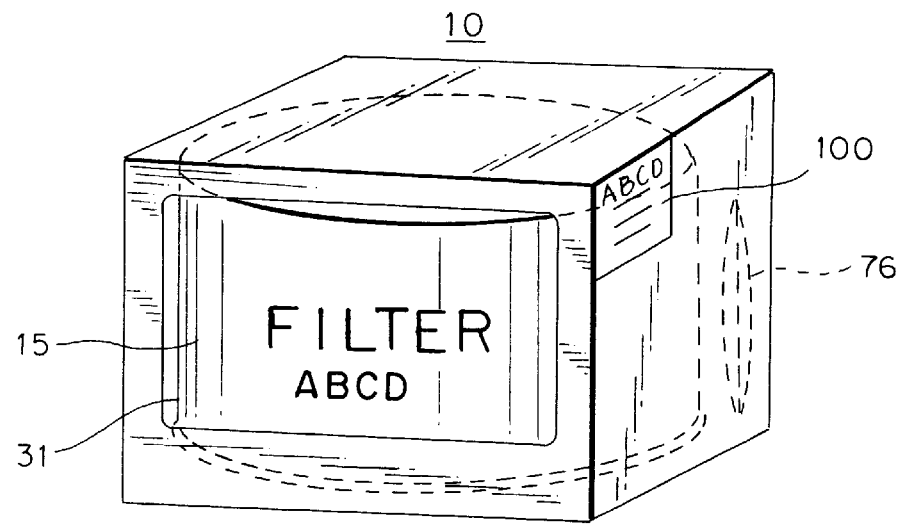
Figure 5:
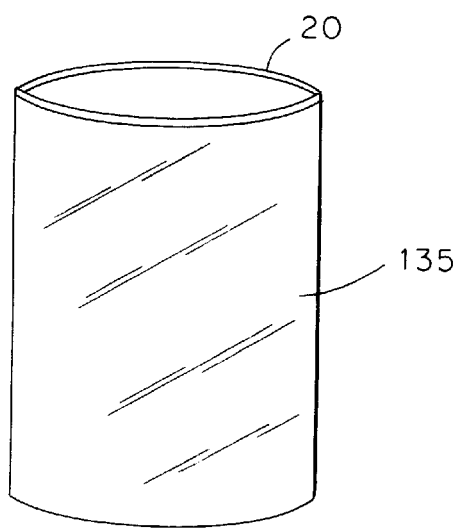
FIG. 5 is a transparent bag which can be used with the kits of the present invention.
Figure 3:
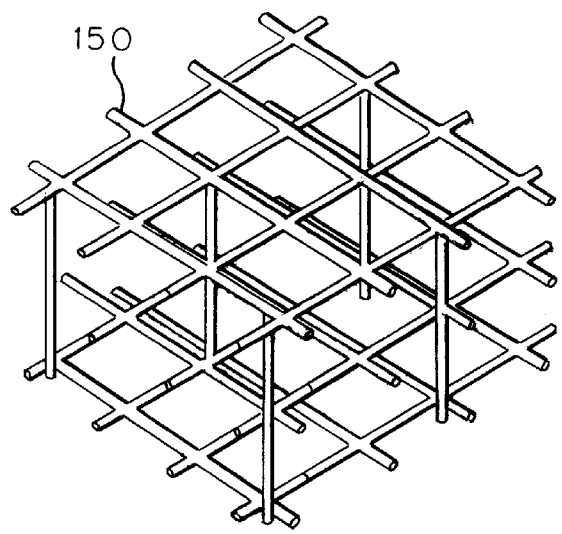
FIG. 3 is a magnified illustration of a section of a substrate from which an enzymatic oxidizing medium is formed.
Figure 4:
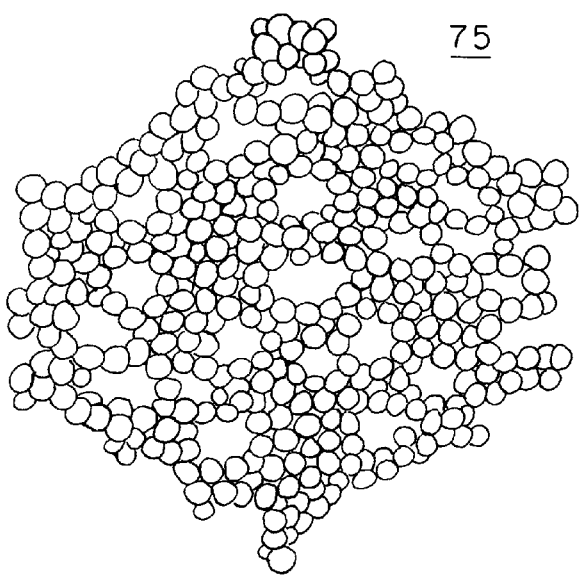
FIG. 4 is a magnified illustration of a section of a completed enzymatic oxidizing medium formed from the substrate of FIG. 3.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A composition capable of decomposing petroleum and petro-chemical based compounds which comprises:
   a) an enzymatic oxidizing medium capable of enzymatically oxidizing petroleum and petro-chemical based compounds; and
   b) a coagulant with covalently bonded hydrogen atoms which forms a solid or gel with petroleum or petro-chemical based compounds in the presence of water at ambient temperature,
   wherein said enzymatic oxidizing medium comprises petroleum digesting microorganisms, nutrients to sustain the petroleum digesting microorganisms until use and initiators which enable resuscitation of said petroleum digesting microorganisms before use.

2. A composition as in claim 1, wherein said petroleum digesting microorganisms are deposited on a solid substrate.

3. A composition as in claim 1, wherein said enzymatic oxidizing medium contains more than one strain of petroleum digesting microorganisms.

4. A composition as in claim 1, wherein said enzymatic oxidizing medium additionally comprises catalytic enzymes which aid in enzymatic oxidizing the petroleum and petro-chemical based compounds.

5. A composition as in claim 1, wherein said enzymatic oxidizing medium oxidizes the petroleum and petro-chemical based compounds to $CO_2$ and water.

6. A composition as in claim 1, wherein said coagulant has at least two covalently bonded hydrogen atoms to a methyl carbon.

7. A composition as in claim 1, wherein said coagulant is a cellulose or cellulose derivative obtained from plant fiber or synthetic polymer.

8. A composition as in claim 1, wherein said coagulant is methylcellulose.

9. A composition as in claim 1 which additionally contains a thickener.

10. A composition as in claim 9, wherein said thickener is selected from pillared clays, kaolimite, magnesia, Fuller's Earth, aluminas, starches, cellulose and granulated paper products, haloysite, illite and monitmorillonite.

11. A composition capable of decomposing petroleum and petro-chemical based contaminants within filter media which comprises petroleum digesting bacteria in a nutrient medium which sustains the petroleum digesting bacteria, methylcellulose and a thickner which additionally comprises initiators which enable resuscitation of said petroleum digesting microorganisms before use.

12. A composition as in claim 11, wherein said thickener is selected from pillared clays, kaolimite, magnesia, Fuller's Earth, aluminas, starches, cellulose and granulated paper products, haloysite, illite and monitmorillonite.

13. A composition as in claim 11 which contains more than one strain of petroleum digesting bacteria.

14. A method for treating filtration components with petroleum and petro-chemical based compounds entrained therein which comprises:
   a) exposing petroleum and petro-chemical based contaminants entrained within a filtration component to a composition comprising:
      i) an enzymatic oxidizing medium having an active ingredient selected from petroleum digesting bacteria, catalytic enzymes and combinations thereof which decompose petroleum and petro-chemical based contaminants within the filtration components;
      ii) a coagulant with covalently bonded hydrogen atoms which forms a solid or gel with petroleum and petro-chemical based compounds in the presence of water at ambient temperature; and
      iii) an amount of water sufficient to activate said coagulant to form a solid or gel with said petroleum or petro-chemical based compounds entrained within said filtration components; and
   b) maintaining said filtration components under ambient conditions wherein the enzymatic oxidizing medium decomposes the petroleum and petro-chemical based compounds.

15. A method as in claim 14, wherein said enzymatic oxidizing medium is dormant prior to exposure to said filtration components and said method includes the additional step of activating said enzymatic oxidizing medium.

16. A method as in claim 14, wherein said filtration components comprise a filter housing with filter media therein and the step of exposing the entrained petroleum and petro-chemical based compounds to said composition comprises:
   i) adding said composition to said filter housing;
   ii) agitating said filter housing with said composition therein; and
   iii) forming a gel with said coagulant, water and petroleum and petro-chemical based compounds.

17. A method for treating filtration components with petroleum and petro-chemical based compounds entrained therein which comprises:
   a) adding to a filtration component a coagulant with covalently bonded hydrogen atoms which forms a solid or gel with petroleum in the presence of water at ambient temperature;
   b) adding water to said filtration component to activate said coagulant;
   c) agitating the water, coagulant, petroleum and petro-chemical compounds entrained within said filtration component to distribute these components;
   d) allowing the distributed coagulant, water, petroleum and petro-chemical based compounds to solidify and/or gel.

18. A method as in claim 17, wherein a thickener is also added to said filtration component.

19. A method as in claim 17, wherein said coagulant is methylcellulose.

20. A method for treating filtration components with petroleum and petro-chemical based compound entrained therein which comprises:
   a) adding to a filtration component a composition capable of decomposing petroleum and petro-chemical based contaminants;
   b) adding water to said filtration component;
   c) agitating the water, composition, petroleum and petro-chemical based compounds entrained within said filtration component to distribute these components; and
   d) allowing the distributed composition, water, petroleum and petro-chemical based compounds to solidify and/or gel, wherein said composition comprises:
      i) an enzymatic oxidizing medium capable of enzymatic oxidizing the petroleum and petro-chemical based contaminants within the filter media identified within the written protocol; and
      ii) a thickener which absorbs petroleum and petro-chemical based compounds.

21. A kit for treating filtration components with petroleum and petro-chemical based compounds entrained therein which comprises:
   a) a written protocol which identifies at least one filtration component for which the kit is suitable for treatment; and b) a composition comprising:
  i) an enzymatic oxidizing medium capable of decomposing the petroleum and petro-chemical based compounds entrained within a filtration component identified within the written protocol;
  ii) a coagulant with covalently bonded hydrogen atoms which forms a solid or gel with petroleum and petro-chemical based compounds in the presence of water at ambient temperature in an amount sufficient to solidify or gel the petroleum and petro-chemical based contaminants within the filtration components identified in the written protocol;
c) wherein the written protocol additionally indicates that said composition be combined with water and said petroleum and petro-chemical based compounds entrained within said filtration components.

22. A kit as in claim 21, wherein said coagulant is a methylcellulose.

23. A kit as in claim 22, wherein said composition additionally contains a thickener.

24. A kit as in claim 21 which additionally comprises a replacement filtration component which conforms to a filtration component identified in said written protocol.

25. A kit as in claim 21 which additionally comprises a transparent, sealable bag of a size sufficient to hold the filtration components identified in the written protocol, said written protocol additionally indicating that filtration components be inserted into the transparent sealable bag and sealed after said composition is combined with water and the petroleum and petro-chemical based compounds within the filtration component.

26. A kit for treating filtration components with petroleum and petro-chemical based compounds entrained therein, which comprises:
  a) a written protocol which identifies at least one filtration component for which the kit is suitable for treatment;
  b) a composition comprising:
    i) an enzymatic oxidizing medium capable of decomposing the petroleum and petro-chemical based compounds entrained within a filtration component identified within the written protocol;
    ii) a thickener in an amount sufficient to absorb all of the petroleum and petro-chemical based compound entrained within a filtration component identified in the written protocol.

27. A kit as in claim 26 wherein said thickener is selected from pillared clays, kaolimite, magnesia, Fuller's Earth, aluminas, starches, cellulose and granulated paper products, haloysite, illite and monitmorillonite.

28. A kit for treating filtration components with petroleum and petro-chemical based compounds entrained therein which comprises:
  a) a written protocol which identifies a filtration component for which the kit is suitable for treatment; and
  b) a coagulant with covalently bonded hydrogen atoms which forms a solid or gel with petroleum or petro-chemical based compounds in the presence of water at ambient temperature, in an amount sufficient to solidify or gel the petroleum or petro-chemical based compounds within the filtration components identified in the written protocol.

29. A kit as in claim 28 which additionally contains a thickener.

30. A kit as in claim 28, wherein said coagulant is a methylcellulose.

31. A kit as in claim 28, wherein the written protocol additionally indicates that said coagulant be placed into the filter housing with water and agitated.

32. A kit as in claim 28 which additionally comprises a sealable bag of a size sufficient to hold the filtration components identified in the written protocol, said written protocol additionally indicating that said filtration components with said coagulant placed therein be inserted into said sealable bag.

33. A kit as in claim 28 which additionally comprises a replacement filtration component which corresponds to a filtration component identified in the written protocol.

34. A kit for treating filtration components with petroleum and petro-chemical based compounds entrained therein which comprises:
  a) a written protocol which identifies at least one filtration component for which the kit is suitable for treatment;
  b) a petroleum digesting microorganism within a nutrient medium which sustains said microorganism,
  wherein said microorganism oxidizes said petroleum and petro-chemical based compounds entrained within a filtration component identified within the written protocol, and the number of microorganisms is sufficient to grow and oxidize all of the petroleum and petro-chemical based compounds within the filtration component identified in the written protocol to $CO_2$ and water, and
  wherein said written protocol additionally indicates that the petroleum digesting bacteria are to be placed within said filtration component.

35. A kit as in claim 34 which comprises a replacement filter component that corresponds to a filtration component identified in the written protocol.

36. A kit as in claim 34 which additionally comprises a transparent, sealable bag of a size sufficient to hold a filtration component identified in the written protocol, said written protocol additionally indicating that said filtration components with the petroleum digesting microorganisms be inserted into said transparent sealable bag.

37. A kit as in claim 34 wherein said written protocol additionally indicates that water should be added to said filtration component.

* * * * *